May 19, 1964 G. DAVIES Re. 25,582

ABRASIVE ELEMENTS

Original Filed July 7, 1959

INVENTOR
GEORGE DAVIES

BY

Watson, Cole, Grindle & Watson

ATTORNEYS

United States Patent Office

Re. 25,582
Reissued May 19, 1964

25,582
ABRASIVE ELEMENTS

George Davies, South Close, La Petite Rte., des Mielles, St. Brelade, Jersey, Channel Islands, assignor of one-half to Hedda Wertheimer, St. Brelade, Jersey, Channel Islands

Original No. 3,050,827, dated Aug. 28, 1962, Ser. No. 825,566, July 7, 1959. Application for reissue June 27, 1963, Ser. No. 292,206

Claims priority, application Great Britain July 9, 1958

1 Claim. (Cl. 29—78)

Matter enclosed in heavy brackets [ ] appears in the original patent but forms no part of this reissue specification; matter printed in italics indicates the additions made by reissue.

This invention relates to abrasive or polishing elements and it is an object of the invention to provide an improved element which will be capable of wide adaptability to a number of purposes.

An abrasive or polishing element according to the invention comprises a flexible backing element to which are attached a series of generally parallel elongated abrasive or polishing members each formed with an abrasive or hard polishing surface.

The backing element may consist of a woven textile material, such as canvas, or it may be of rubber or synthetic rubber or a flexible synthetic resin, or elastomer.

In a preferred form the abrasive members are in the form of metal wires, and each may be formed with a series of small serrations or notches longitudinally spaced along the length of the wire. The abrasive members may be closely packed and in close contact with one another along their full length. Alternatively they may be spaced from one another over at least parts of their lengths. They may be straight or sinuous.

According to a preferred feature the backing element is perforated or slotted to allow swarf to pass between the abrasive members and through the backing element.

In one construction the abrasive or polishing members are provided on both opposite faces of the flexible backing element. In a modification the members on one side of the backing element are arranged parallel to one another in a direction inclined to or at right angles with the members on the opposite face of the backing element. The flexible backing element is preferably in the form of a thin sheet, and preferably the abrasive members are attached to the backing element along their full lengths, by an adhesive, or bonded thereto.

Since the abrading members may be manufactured of metal the element can have all the cutting capabilites of a steel file while yet remaining fully flexible at least in one direction to conform to any desired contour. The backing element will normally be easily severed and the element will therefore be capable of being divided readily into strips of any width and can be secured readily by an adhesive for instance to any type of support. Moreover, as compared with emery paper the element is unaffected by moisture and has a relatively long life.

Figure 1:
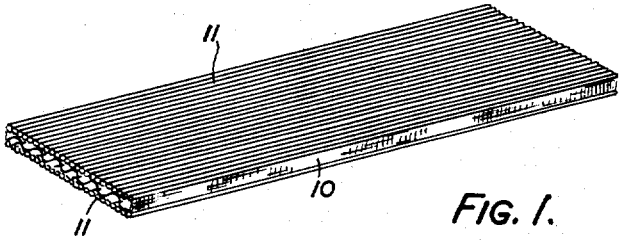
Figure 2:
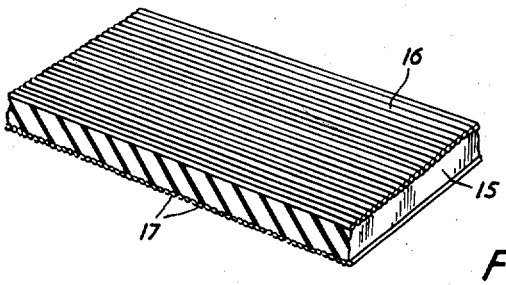
Figure 3:
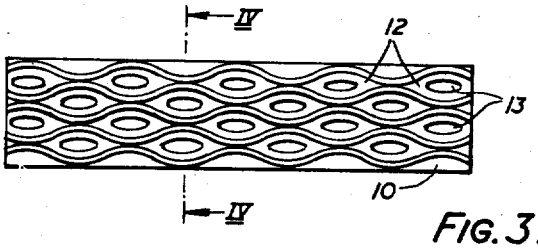
Figure 4:
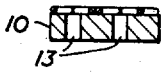
Figure 5:
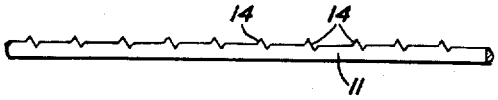

The invention may be performed in various different ways but one specific embodiment and various modifications thereof will now be described by way of example with reference to the accompanying drawings in which FIGURE 1 is a perspective view of one form of the invention, FIGURE 2 is a perspective view of a modified form of construction, FIGURE 3 is a plan view of a further modified form, FIGURE 4 is a cross-sectional view on the line IV—IV in FIGURE 3, and FIGURE 5 is a side view on an enlarged scale of one of the metal wires, showing one form of suitable abrasive surface.

In the first example the invention comprises a flexible supporting sheet 10 of cloth or canvas approximately .05 inch thick, to both surfaces of which are bonded a number of parallel metal wires 11 provided with abrasive surfaces on the side remote from the cloth. These wires are arranged closely adjacent to one another and when the supporting sheet is flat the wires are actually in physical contact along their lengths. The wires may be formed with longitudinal bends or waves by a process of crimping before bonding and in such case they may be arranged with the peaks of the waves aligned transversely so that the wires are in contact along their full length. Alternatively, however, the wires may be arranged with the peaks of individual wires or groups of wires opposed to the peaks of other wires so that gaps 12 are formed between the wires as shown in FIGURE 3.

In any event, but particularly in the construction illustrated in FIGURE 3 where gaps are formed between the wires, the flexible supporting sheets may be formed with perforations 13 aligned with the gaps 12 between the wires to allow swarf or dust to pass through the element. This prevents the element becoming clogged during use.

The abrasive surface on the wires is preferably provided by forming longitudinally spaced sharp edged notches 14 therein, each notch being associated with a corresponding small sharp tooth standing proud of the surface of the wire. Other forms of abrasive surface may be employed; for example the wires may each be formed with a sharp edged spiral rib or alternatively they may be coated with an abrasive surface, for example by electro-chemical deposition of a hard metal such as chromium.

In some cases it may be sufficient to provide abrasive wires on one side only of the sheet. Where abrasive members are attached on both surfaces of the flexible supporting sheet the abrasive surface may be fine on one side and coarse on the other. Moreover in some cases it may be desirable that the complete element should be rigid and in such case the element can be built up as shown in FIGURE 2 from a sheet of neoprene rubber 15 with the abrading members 16 on one side lying in a direction substantiially perpendicular to the direction of the abrading members 17 on the other side.

An abrading element as described can readily be cut into small width strips and bonded to a backing member or block of any desired curvature.

If smooth surfaced hard metal wires are used the element acts as an effective metal burnisher or polisher.

What I claim as my invention and desire to secure by Letters Patent is:

An abrasive element consisting of a flexible backing of thin sheet material, and a plurality of metal wires secured to said flexible backing, all of the wires secured to said flexible backing being parallel to each other, whereby said element is free to conform to a simple curve in a plane perpendicular to said wires without bending any of said wires, [each] *some* of said wires being formed with an abrasive surface directed away from said backing.

References Cited in the file of this patent or the original patent

UNITED STATES PATENTS

| | | |
|---|---|---|
| 725,761 | Nash | Apr. 21, 1903 |
| 847,190 | Landis | Mar. 12, 1907 |
| 2,665,528 | Sternfield | Jan. 12, 1954 |
| 2,885,703 | Elliott | May 12, 1959 |
| 2,942,285 | Gray | June 28, 1960 |

FOREIGN PATENTS

| | | |
|---|---|---|
| 729,555 | Great Britain | Mar. 26, 1958 |